United States Patent
Son et al.

(10) Patent No.: US 10,086,880 B2
(45) Date of Patent: Oct. 2, 2018

(54) BATTERY SUPPORT STRUCTURE OF VEHICLE BODY

(71) Applicants: Hyundai Motor Company, Seoul (KR); Kia Motors Corporation, Seoul (KR)

(72) Inventors: Kyung Hoon Son, Suwon-si (KR); Ki Hwan Kim, Seoul (KR); Ki Nam Kang, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/607,592

(22) Filed: May 29, 2017

(65) Prior Publication Data

US 2018/0134324 A1    May 17, 2018

(30) Foreign Application Priority Data

Nov. 17, 2016    (KR) .................... 10-2016-0153383

(51) Int. Cl.

| | |
|---|---|
| *B60K 1/04* | (2006.01) |
| *B62D 25/20* | (2006.01) |
| *H01M 2/10* | (2006.01) |
| *B62D 21/02* | (2006.01) |
| *B62D 27/02* | (2006.01) |

(Continued)

(52) U.S. Cl.
CPC ............ *B62D 25/2027* (2013.01); *B60K 1/04* (2013.01); *B62D 25/2036* (2013.01); *H01M 2/1083* (2013.01); *B60K 2001/0405* (2013.01); *B60K 2001/0416* (2013.01); *B60R 16/04* (2013.01); *B62D 21/02* (2013.01); *B62D 21/09* (2013.01); *B62D 25/20* (2013.01); *B62D 25/2009* (2013.01); *B62D 27/02* (2013.01);

(Continued)

(58) Field of Classification Search
CPC .............. B62D 25/207; B62D 25/2036; B62D 25/2009; B62D 25/20; B62D 27/02; B60K 1/04; B60K 2001/0405; B60K 2001/0438; B60K 2001/0416

See application file for complete search history.

(56) References Cited

U.S. PATENT DOCUMENTS

| | | | | |
|---|---|---|---|---|
| 5,370,438 | A | * 12/1994 | Mori .................... | B62D 25/02 296/203.02 |
| 6,053,564 | A | * 4/2000 | Kamata ................ | B62D 21/09 296/187.09 |

(Continued)

FOREIGN PATENT DOCUMENTS

| | | |
|---|---|---|
| KR | 100633910 B1 | * 10/2006 |
| KR | 20120033181 A | * 4/2012 |

*Primary Examiner* — James A Shriver, II
*Assistant Examiner* — Steve Clemmons
(74) *Attorney, Agent, or Firm* — Slater Matsil, LLP

(57) ABSTRACT

A battery support structure of a vehicle includes a number of battery support members installed on a bottom surface of a rear floor of a vehicle body to support a battery unit. The battery support members include cross members for battery support extending in a widthwise direction of the vehicle body. A pair of side sills is installed on opposite sides of the rear floor. A rear cross member is installed on the bottom surface of the rear floor. At least one of the plurality of cross members for battery support is connected to the rear cross member and the side sill.

20 Claims, 12 Drawing Sheets

(51) Int. Cl.
*B62D 21/09* (2006.01)
*B60R 16/04* (2006.01)
(52) U.S. Cl.
CPC ............ *H01M 2/10* (2013.01); *H01M 2/1016* (2013.01); *H01M 2/1072* (2013.01)

(56) References Cited

U.S. PATENT DOCUMENTS

| | | | | |
|---|---|---|---|---|
| 6,099,194 | A * | 8/2000 | Durand | B62D 21/02 |
| | | | | 296/204 |
| 6,431,300 | B1 * | 8/2002 | Iwase | B60K 1/04 |
| | | | | 180/68.5 |
| 6,568,745 | B2 * | 5/2003 | Kosuge | B62D 21/157 |
| | | | | 296/187.12 |
| 7,147,272 | B2 * | 12/2006 | Odaka | B62D 21/157 |
| | | | | 296/187.12 |
| 7,192,071 | B2 * | 3/2007 | Watanabe | B62D 25/025 |
| | | | | 296/187.02 |
| 8,939,246 | B2 * | 1/2015 | Yamaguchi | B60K 1/04 |
| | | | | 180/311 |
| 9,022,152 | B2 * | 5/2015 | Imamura | B62D 21/157 |
| | | | | 180/68.5 |
| 9,090,160 | B2 * | 7/2015 | Yoshida | B62D 21/155 |
| 9,669,879 | B2 * | 6/2017 | Hofer | B62D 27/02 |
| 9,802,649 | B2 * | 10/2017 | Ewert | B62D 21/15 |
| 2014/0239674 | A1 * | 8/2014 | An | B62D 25/025 |
| | | | | 296/209 |
| 2017/0113541 | A1 * | 4/2017 | Muramatsu | B60K 15/063 |
| 2017/0267121 | A1 * | 9/2017 | Kotik | B60L 11/1879 |
| 2017/0334487 | A1 * | 11/2017 | Fritz | B62D 21/157 |

* cited by examiner

BATTERY SUPPORT STRUCTURE OF VEHICLE BODY

CROSS-REFERENCE TO RELATED APPLICATIONS

This application is based on and claims the benefit of priority to Korean Patent Application No. 10-2016-0153383, filed on Nov. 17, 2016, in the Korean Intellectual Property Office, the disclosure of which is incorporated herein in its entirety by reference.

TECHNICAL FIELD

The present disclosure relates to a battery support structure of a vehicle body.

BACKGROUND

In recent years, as recognition of crises of environments and depletion of fossil fuels has increased, studies on electric vehicles that are environment-friendly vehicles have been spotlighted. The electric vehicles include plug-in hybrid electric vehicles (PHEVs), battery electric vehicles (BEVs), and fuel cell electric vehicles (FCEVs).

A high-voltage battery is mounted on the vehicle body of an electric vehicle, and because the battery has a large volume and a heavy weight (about 500 kg), it is important to secure a suitable mounting space in the vehicle body in order to mount the battery to the vehicle body. Further, because it is also important to secure an operation of mounting the battery having the considerable volume and the heavy weight on the vehicle body, studies on design of vehicle bodies for mounting the battery have been spotlighted.

The high-voltage battery is mounted on a floor of the vehicle body. For example, the battery may be mounted on an upper portion or a lower portion of a floor panel through a mounting structure.

Meanwhile, a plurality of support members for supporting the battery is installed under a floor of the vehicle body.

However, according to the conventional support member, the strength of the vehicle body is low due to the vulnerable strength of the connection structure that considers the strength of the vehicle body, the travel performance of the vehicle becomes lower due to the lowering of the strength of the vehicle body, and the weight of the vehicle body cannot be reduced.

SUMMARY

The present disclosure relates to a battery support structure of a vehicle body. Particular embodiments relate to a battery support structure of a vehicle body that may effectively secure a strength of the vehicle body and decrease the weight of the vehicle body by connecting an end of a cross member for battery support to a rear cross member and a side sill.

Embodiments of the present disclosure can solve above-mentioned problems occurring in the prior art while advantages achieved by the prior art are maintained intact.

An embodiment of the present disclosure provides a battery support structure of a vehicle that may effectively secure the strength of the vehicle and reduce the weight of the vehicle by connecting an end of a cross member for battery support to a rear cross member and a side sill.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a battery support structure of a vehicle may include a plurality of battery support members installed on a bottom surface of a rear floor of a vehicle body to support a battery unit. The plurality of battery support members may include a plurality of cross members for battery support extending in a widthwise direction of the vehicle body. A pair of side sills may be installed on opposite sides of the rear floor. A rear cross member may be installed on the bottom surface of the rear floor. At least one of the plurality of cross members for battery support may be connected to the rear cross member and the side sill.

One of the plurality of cross members for battery support, which is adjacent to an end of the rear cross member, may be connected to the rear cross member and the side sill via a connection member.

The connection member may include a first connection portion connected to the rear cross member and the corresponding cross member for battery support, and a second connection portion connected to an end of the side sill.

A pair of side members may be installed on opposite sides of the rear floor, and side sills may be installed in the side frames, respectively.

The first connection portion may include a top flange coupled to top portions of the side members, a bottom flange coupled to bottom portions of the side members, and a web connected to the side members and the rear cross member.

The top flange of the first connection portion may be coupled to the top portions of the side members through welding.

The bottom flange of the first connection portion may be coupled to the bottom portions of the side members through welding, and an end of the cross member for battery support may be coupled to the bottom flange of the first connection portion through a coupling member.

The web of the first connection portion may be connected to the side members and ends of the rear cross member through a coupling member.

The second connection portion may include a top flange coupled to top portions of the side sills through a coupling member, a bottom flange coupled to bottom portions of the side sills through a coupling member, and a web coupled to side walls of the side sills through a coupling member.

The battery support structure may further include a plurality of battery support lengthwise members extending in a lengthwise direction of the vehicle body.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Hereinafter, exemplary embodiments of the present disclosure will be described in detail with reference to the accompanying drawings. For reference, the sizes of the components and the thickness of the lines of the drawings may be rather exaggerated for convenience of understanding. Further, the terms used in the description of the present disclosure may be different according to the users, the intentions of the operators, or the customs in consideration of the functions in the present disclosure. Therefore, definition of the terms should be made according to the overall disclosure set forth herein.

Figure 1:
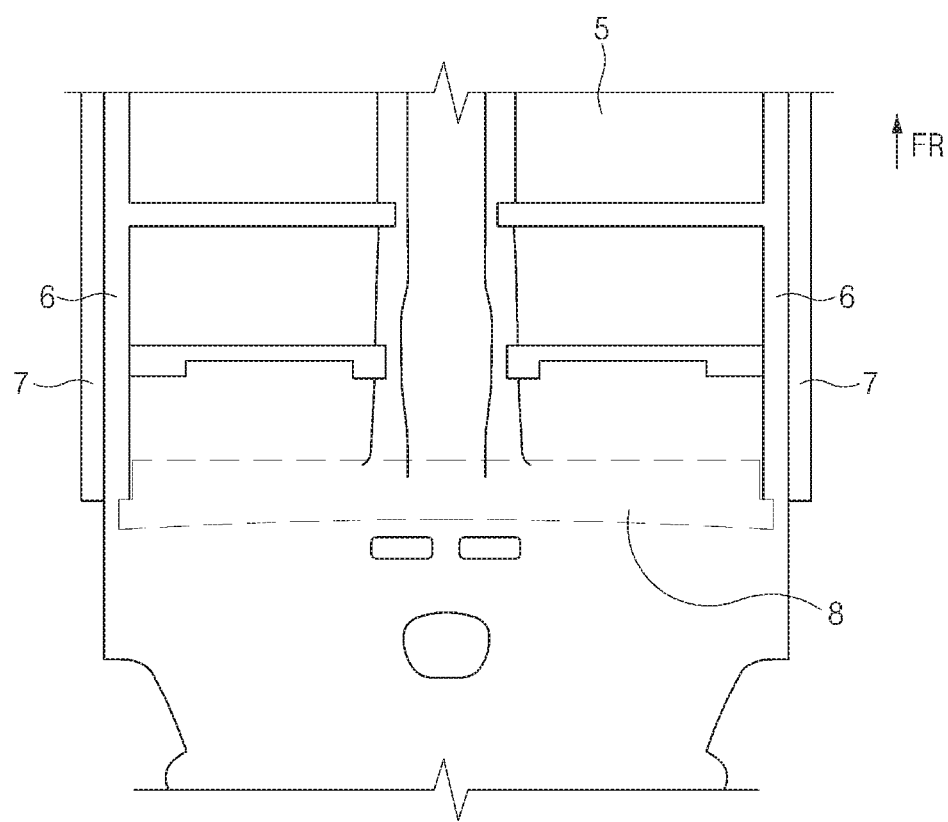
FIG. 1 is a plan view illustrating an upper surface of a rear floor, to which a battery support structure of a vehicle body according to an embodiment of the present disclosure is applied.
Figure 2:
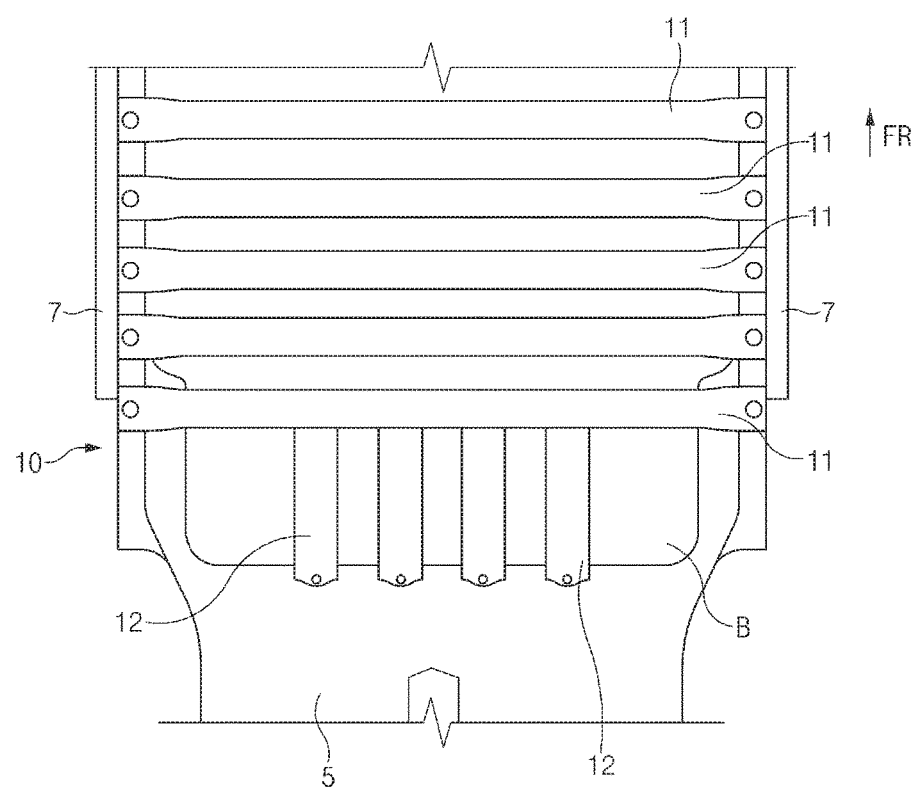
FIG. 2 is a plan view illustrating a bottom surface of the rear floor, to which the battery support structure of a vehicle body according to the embodiment of the present disclosure is applied.

Referring to FIGS. 1 and 2, a battery support structure of a vehicle body according to an embodiment of the present disclosure may include a plurality of battery support members 11 and 12 installed on a bottom surface of a rear floor 5.

A pair of side members 6 may be installed on opposite sides of a rear floor 5 along a lengthwise direction of the vehicle body. Side sills 7 may be installed in the side members 6, respectively. Accordingly, the pair of side sills 7 may be disposed on opposite sides of the rear floor 5.

A battery unit B may include one or more battery modules, a frame member supporting the battery modules, and a housing and a cover surrounding the battery modules.

As illustrated in FIG. 2, the battery unit B may be mounted on the bottom surface of the rear floor 5 to be supported by the bottom surface of the rear floor 5.

The plurality of battery support members 11 and 12 may include a plurality of cross members for battery support 11 extending in a widthwise direction of the vehicle body, and a plurality of battery support lengthwise members 12 extending in a lengthwise direction of the vehicle body.

The plurality of cross members for battery support 11 may be spaced apart from each other in a lengthwise direction of the vehicle body, and the cross members for battery support 11 may be installed under the rear floor 5 in a widthwise direction of the vehicle body as in FIG. 2. Opposite ends of the cross members for battery support 11 may be coupled to the side members 6, respectively.

Figure 9:
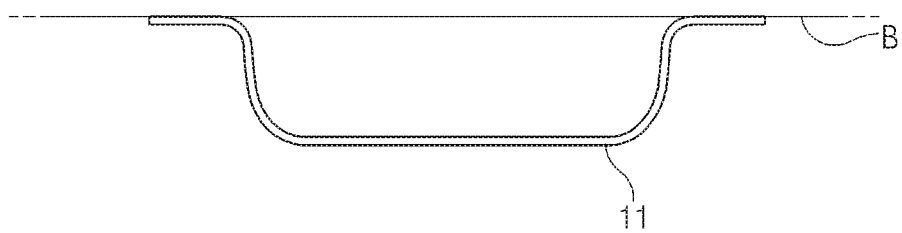
FIG. 9 is a sectional view taken along line E-E of FIG. 8.

As in FIG. 9, the at least one cross member for battery support 11 may be adhered to a lower side of the battery unit B to form a closed section.

The plurality of battery support lengthwise members 12 may be spaced apart from each other in a width direction of the vehicle body, and the battery support lengthwise members 12 may be installed under the rear floor 5 in a lengthwise direction of the vehicle body.

Figure 6:
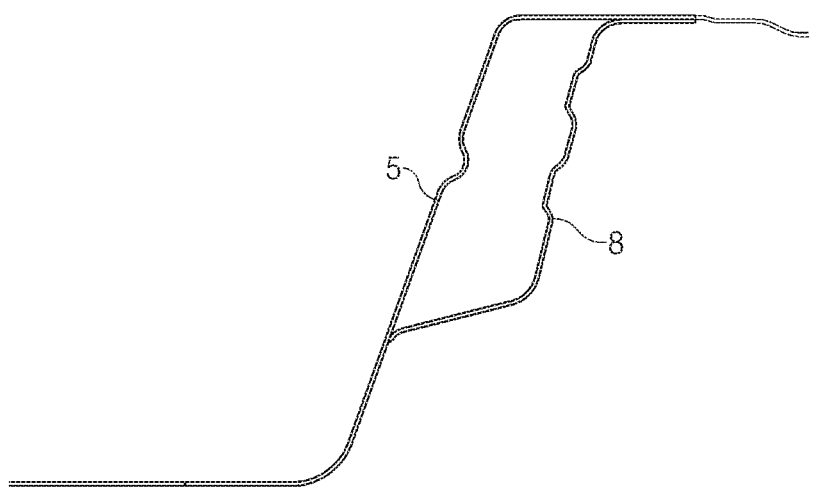
FIG. 6 is a sectional view of the rear floor and the rear cross member, taken along line B-B of FIG. 5.

As illustrated in FIG. 6, a rear cross member 8 may be installed on one side of the bottom surface of the rear floor 5 in a widthwise direction of the vehicle body. In this way, as the rear cross member 8 is installed on one side of the bottom surface of the rear floor 5 through welding, a part in which the rear cross member 8 is installed may form a closed section.

Figure 3:
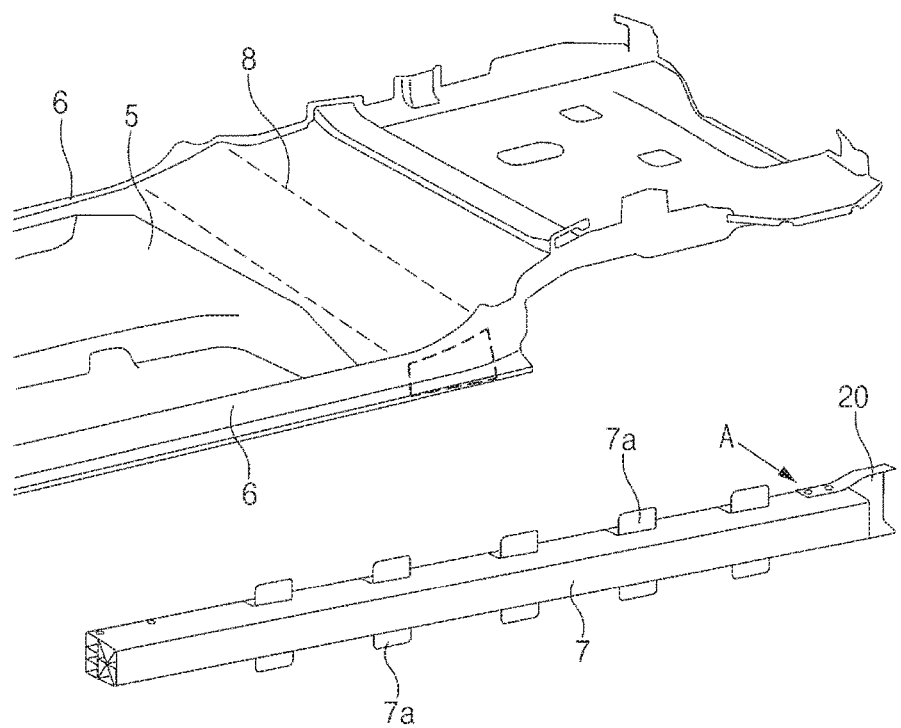
FIG. 3 is an exploded perspective view illustrating a rear floor and a side sill of the battery support structure of a vehicle body according to the embodiment of the present disclosure.
Figure 7:
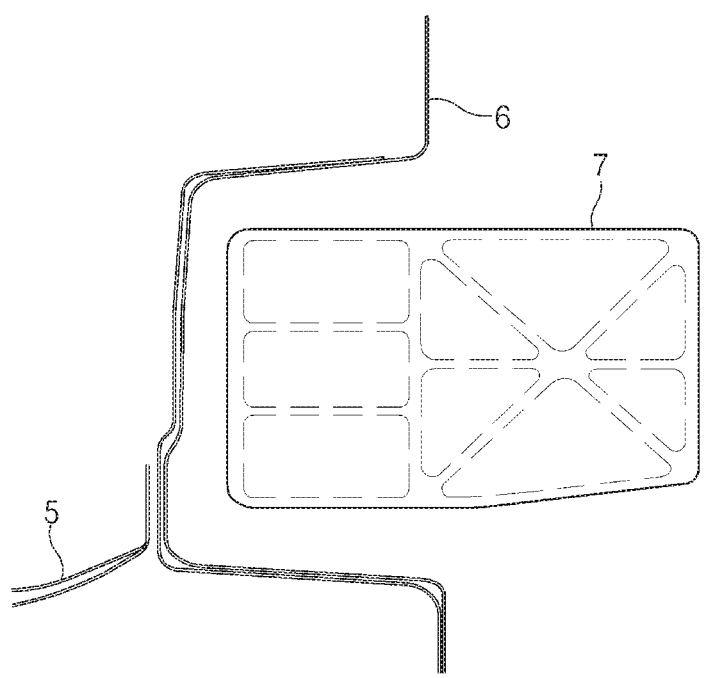
FIG. 7 is a sectional view of the side sill, taken along line C-C of FIG. 5.
Figure 8:
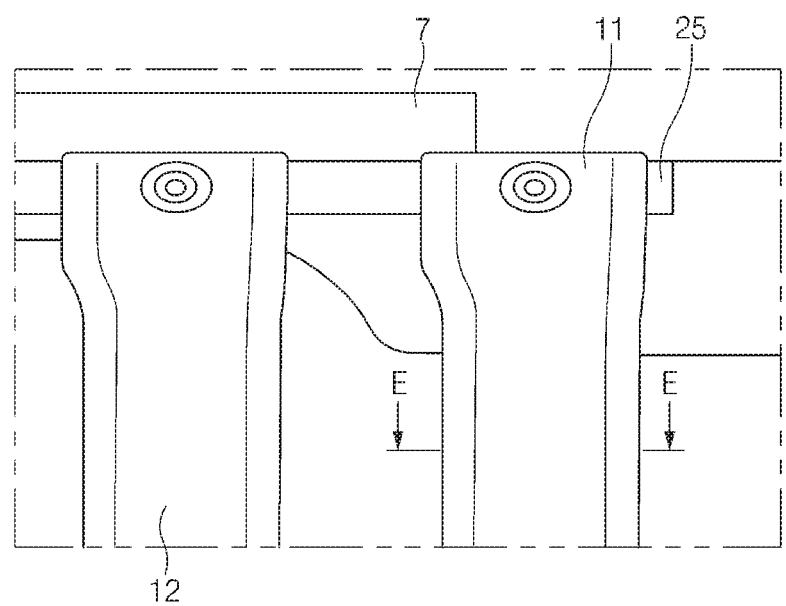
FIG. 8 is a bottom view along arrow D of FIG. 5.

As illustrated in FIG. 3, the side sills 7 may be installed in the side members 6 through brackets 7a, respectively, and each of the side sills 7 may form a closed section as illustrated in FIG. 7.

Figure 5:
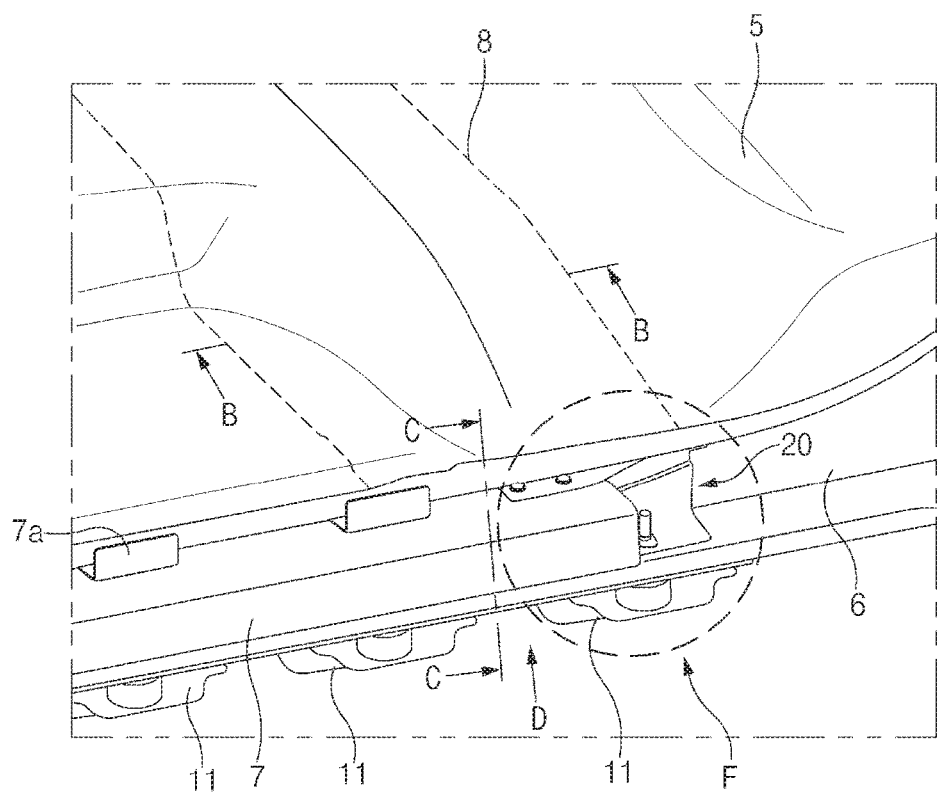
FIG. 5 is a perspective view illustrating a structure in which a cross member for battery support of the battery support structure of a vehicle body according to the embodiment of the present disclosure is connected to the side sill and a rear cross member through a connection structure.
Figure 10:
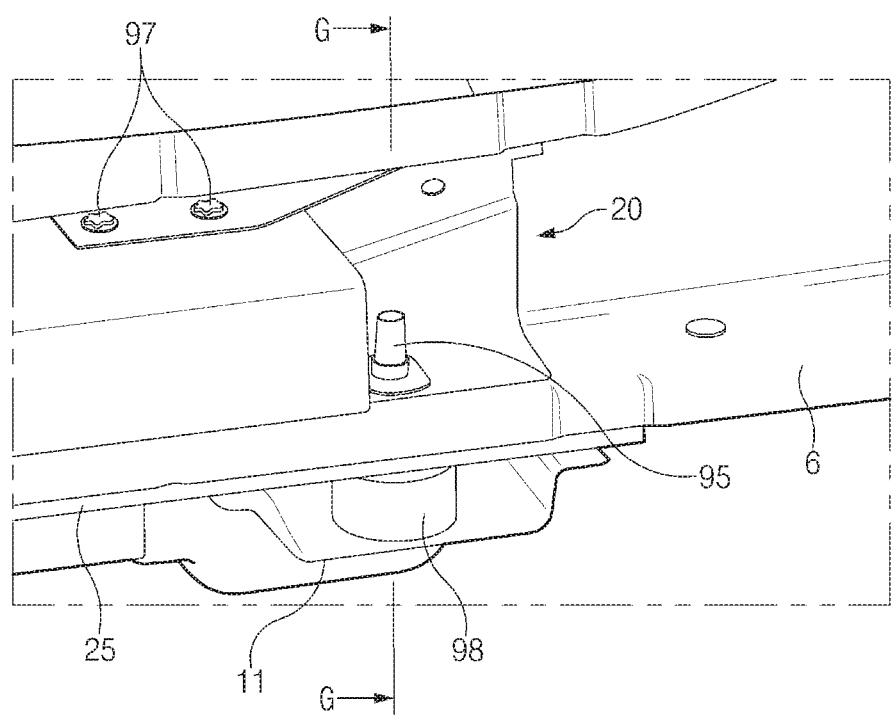
FIG. 10 is an enlarged view of a portion of arrow F of FIG. 5.

As illustrated in FIGS. 5 and 10, at least one of the plurality of cross members for battery support 11, which is adjacent to an end portion of the rear cross member 8, may be connected to the end portion of the rear cross member 8 and each of the side sills 7 via the connection member 20.

The connection member 20 may include a first connection portion 21 connected to the end portion of the rear cross member 8 and the cross member for battery support 11 in each of the side members 6, and a second connection portion 22 connected to an end portion of each of the side sill 7 in each of the side member 6.

Figure 11:
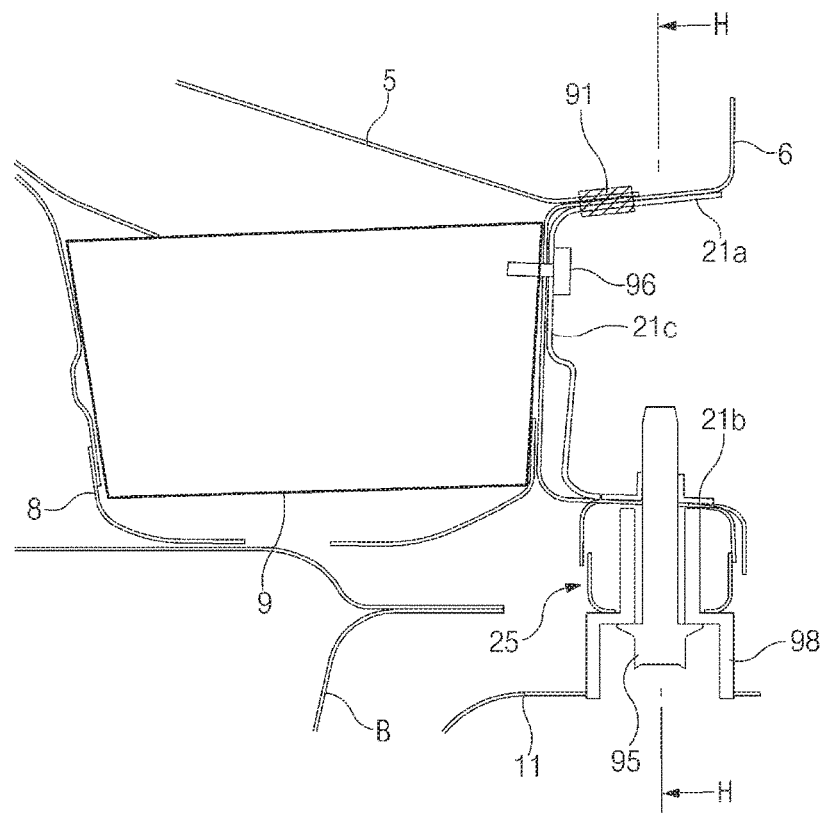
FIG. 11 is a sectional view taken along line G-G of FIG. 10.
Figure 12:
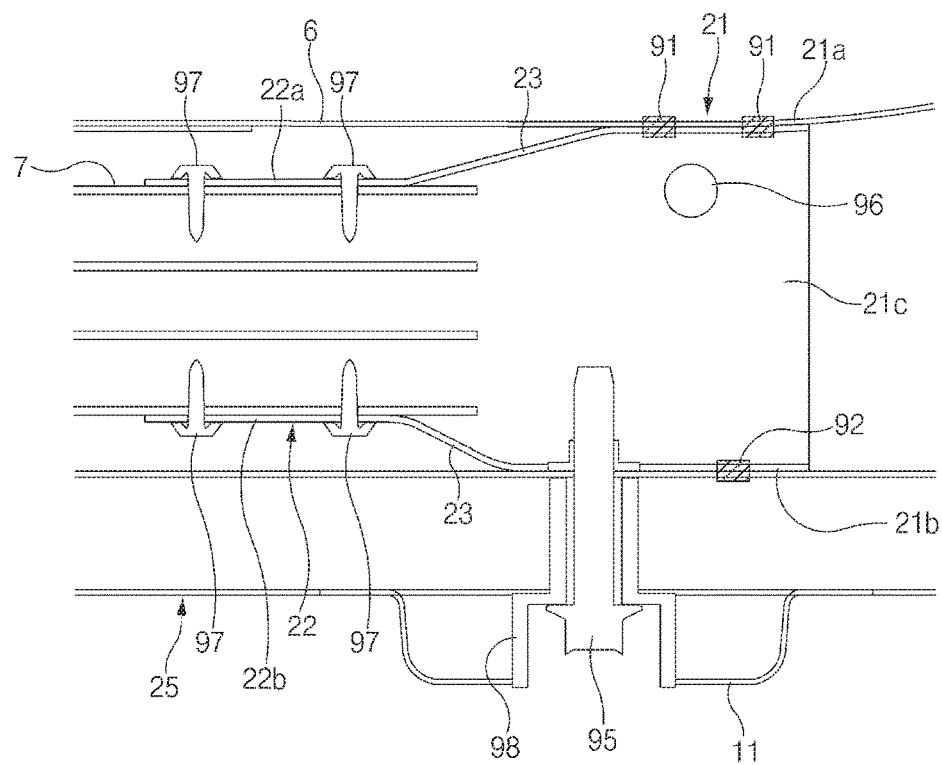
FIG. 12 is a sectional view taken along line H-H of FIG. 11.

As illustrated in FIGS. 10 to 12, a top flange 21a of the first connection portion 21 may be coupled to top portion of each of the side members 6 through welding 91, a bottom flange 21b of the first connection portion 21 may be coupled to bottom portion of each of the side members 6 through welding 92, and an end of the cross member for battery support 11 may be coupled to the bottom flange 21b of the first connection portion 21 through a coupling member 95. A web 21c of the first connection portion 21 may be connected to side wall of each of the side members 6 and the end portion of the rear cross member 8 through a coupling member 96.

A cap nut 98 may be mounted on an end of the cross member for battery support 11, and the cross member for battery support 11 may be coupled to the bottom flange 21b of the first connection portion 21 by coupling the coupling member 95 to the cap nut 98. Further, the cap nut 98 may pass through a reinforcing member 25 disposed under the side sill 7.

As illustrated in FIG. 11, one or more bulk heads 9 may be installed in the interior of the rear cross member 8. The bulk head 9 may be installed in the interior of an end of the rear cross member 8, and the web 21c of the first connection portion 21 may be coupled to the bulk head 9 through a coupling member 96 so that the first connection portion 21 may be connected to end portion of the rear cross member 8.

Figure 4:
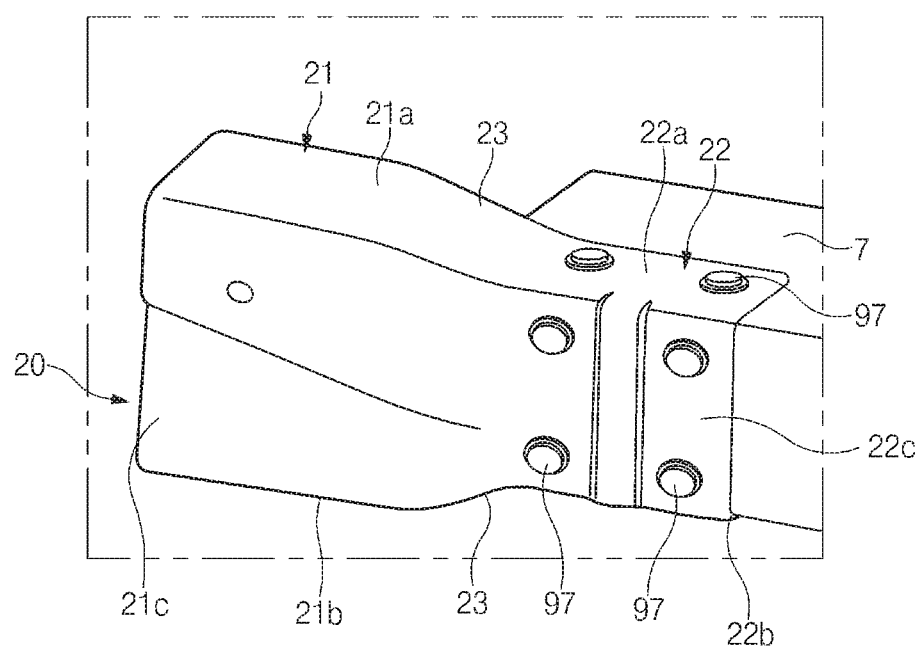
FIG. 4 is a perspective view viewed from a direction of arrow A of FIG. 3.

As illustrated in FIGS. 10 to 12, a top flange 22a of the second connection portion 22 may be coupled to the top portion of each of the side sills 7 through a coupling member 97, and a bottom flange 22b of the second connection portion 22 may be coupled to the bottom portion of each of the side sills 7 through the coupling member 97. A web 22C of the second connection portion 22 may be coupled to side wall of each of the side sills 7 through the coupling member 97 (see FIG. 4).

The height of the first connection portion 21 is larger than the height of the second connection portion 22, and accordingly, at least one inclined portion 23 may be formed between the first connection portion 21 and the second connection portion 22.

Meanwhile, according to the conventional technology, a reinforcing member is installed at an end of a side sill, and accordingly, the size of the side sill increases. In contrast, according to the present disclosure, because the size of the side sill 7 may be remarkably reduced as the connection member 20 is installed at an end of the side sill 7, the side structure of the rear floor 5 may become compact.

Further, according to the present disclosure, because the rear cross member 8, the cross member for battery support 11, and the side sills 7 may be coupled to each other in a 3-axis direction by the connection member 20 installed at an end of the side sill 7, torsion strength may be enhanced.

Further, because the rear cross member 8, the side sill 7, and the cross member for battery support 11 forming a closed section (see FIGS. 6, 7, and 9) are connected to each other in three-axis directions via the connection member 20, the support strength of the battery unit B as well as the strength of the vehicle body may be remarkably enhanced.

According to the present disclosure, the strength of the vehicle may be effectively secured and the weight of the vehicle may be effectively reduced by connecting an end of the cross member for battery support to the rear cross member and the side sill, and accordingly, the travel performance of the vehicle may be improved.

Although the detailed embodiment of the present disclosure has been described until now, the present disclosure is not limited to the embodiment disclosed in the specification and the accompanying drawings, and the present disclosure may be variously modified by those skilled in the art without departing from the technical spirit of the present disclosure.

What is claimed is:

1. A battery support structure of a vehicle, the battery support structure comprising:
   a plurality of battery support members configured to be installed on a bottom surface of a rear floor of a vehicle body to support a battery unit, wherein the plurality of battery support members comprise a plurality of cross members extending in a widthwise direction of the vehicle body;
   two side sills configured to be installed on opposite sides of the rear floor;
   a rear cross member is installed on the bottom surface of the rear floor, wherein at least one of the plurality of cross members is connected to the rear cross member and each of the side sills; and
   a bulk head installed in an interior of an end of the rear cross member;
   wherein at least one of the plurality of cross members for battery support, which is adjacent to an end portion of the rear cross member, is connected to the end portion of the rear cross member and the side sills via a connection member;
   wherein the connection member comprises a first connection portion connected to the end portion of the rear cross member and a corresponding cross member for battery support; and
   wherein the first connection portion is coupled to the bulk head through a coupling member so that the first connection portion is connected to the end portion of the rear cross member.

2. The battery support structure of claim 1, wherein the connection member further comprises a second connection portion connected to an end portion of each of the side sills.

3. The battery support structure of claim 2, further comprising two side members that are respectively installed on opposite sides of the rear floor, the side sills being respectively installed in a pair of side members.

4. The battery support structure of claim 3, wherein the first connection portion comprises:
   a top flange coupled to top portion of each of the side members;
   a bottom flange coupled to bottom portion of each of the side members; and
   a web connected to each of the side members and the end portion of the rear cross member.

5. The battery support structure of claim 4, wherein the top flange of the first connection portion is coupled to the top portion of each of the side members through welding.

6. The battery support structure of claim 4, wherein the bottom flange of the first connection portion is coupled to the bottom portion of each of the side members through welding, and an end portion of the cross member for battery support is coupled to the bottom flange of the first connection portion through a coupling member.

7. The battery support structure of claim 4, wherein the web of the first connection portion is connected to each of the side members and the end portion of the rear cross member through a coupling member.

8. The battery support structure of claim 3, wherein the second connection portion comprises:
   a top flange coupled to top portion of each of the side sills through a coupling member;
   a bottom flange coupled to bottom portion of each of the side sills through a coupling member; and
   a web coupled to side wall of each of the side sills through a coupling member.

9. The battery support structure of claim 1, further comprising a plurality of battery support lengthwise members extending in a lengthwise direction of the vehicle body.

10. The battery support structure of claim 9, wherein the connection member further comprises a second connection portion connected to an end portion of each of the side sills.

11. The battery support structure of claim 10, further comprising two side members that are respectively installed on opposite sides of the rear floor, the side sills being respectively installed in a pair of side frames.

12. The battery support structure of claim 11, wherein the first connection portion comprises:
   a top flange coupled to top portion of each of the side members;
   a bottom flange coupled to bottom portion of each of the side members; and
   a web connected to each of the side members and the end portion of the rear cross member.

13. A vehicle, comprising:
   a vehicle body that includes a rear floor;
   a plurality of battery support members installed on a bottom surface of the rear floor to support a battery unit, wherein the plurality of battery support members comprise a plurality of cross members for battery support extending in a widthwise direction of the vehicle body;
   two side sills installed on opposite sides of the rear floor;
   a rear cross member installed on the bottom surface of the rear floor, wherein at least one of the plurality of cross members for battery support is connected to the rear cross member and each of the side sills; and a bulk head installed in an interior of an end of the rear cross member;

wherein at least one of the plurality of cross members for battery support, which is adjacent to an end portion of the rear cross member, is connected to the end portion of the rear cross member and the side sills via a connection member;

wherein the connection member comprises a first connection portion connected to the end portion of the rear cross member and a corresponding cross member for battery support; and wherein the first connection portion is coupled to the bulk head through a coupling member so that the first connection portion is connected to the end portion of the rear cross member.

14. The vehicle of claim 13, further comprising a plurality of battery support lengthwise members extending in a lengthwise direction of the vehicle body.

15. The vehicle of claim 14, wherein the connection member further comprises a second connection portion connected to an end portion of each of the side sills.

16. The vehicle of claim 15, further comprising two side members respectively installed on opposite sides of the rear floor, wherein the side sills are respectively installed in a pair of side members.

17. The vehicle of claim 16, wherein the first connection portion comprises:

a top flange coupled to top portion of each of the side members;

a bottom flange coupled to bottom portion of each of the side members; and a web connected to each of the side members and the end portion of the rear cross member.

18. The vehicle of claim 17, wherein the top flange of the first connection portion is coupled to the top portion of each of the side members through welding;

wherein the bottom flange of the first connection portion is coupled to the bottom portion of each of the side members through welding, and an end portion of the cross member for battery support is coupled to the bottom flange of the first connection portion through a coupling member; and wherein the web of the first connection portion is connected to each of the side members and the end portion of the rear cross member through a coupling member.

19. The vehicle of claim 16, wherein the second connection portion comprises:

a top flange coupled to top portion of each of the side sills through a coupling member;

a bottom flange coupled to bottom portion of each of the side sills through a coupling member; and a web coupled to side wall of each of the side sills through a coupling member.

20. The vehicle of claim 13, further comprising a battery supported by the battery support members.

* * * * *